Aug. 31, 1943.　　　F. I. GOSSER　　　2,328,138
COLLAPSIBLE TRAILER
Filed April 27, 1942　　　3 Sheets-Sheet 1
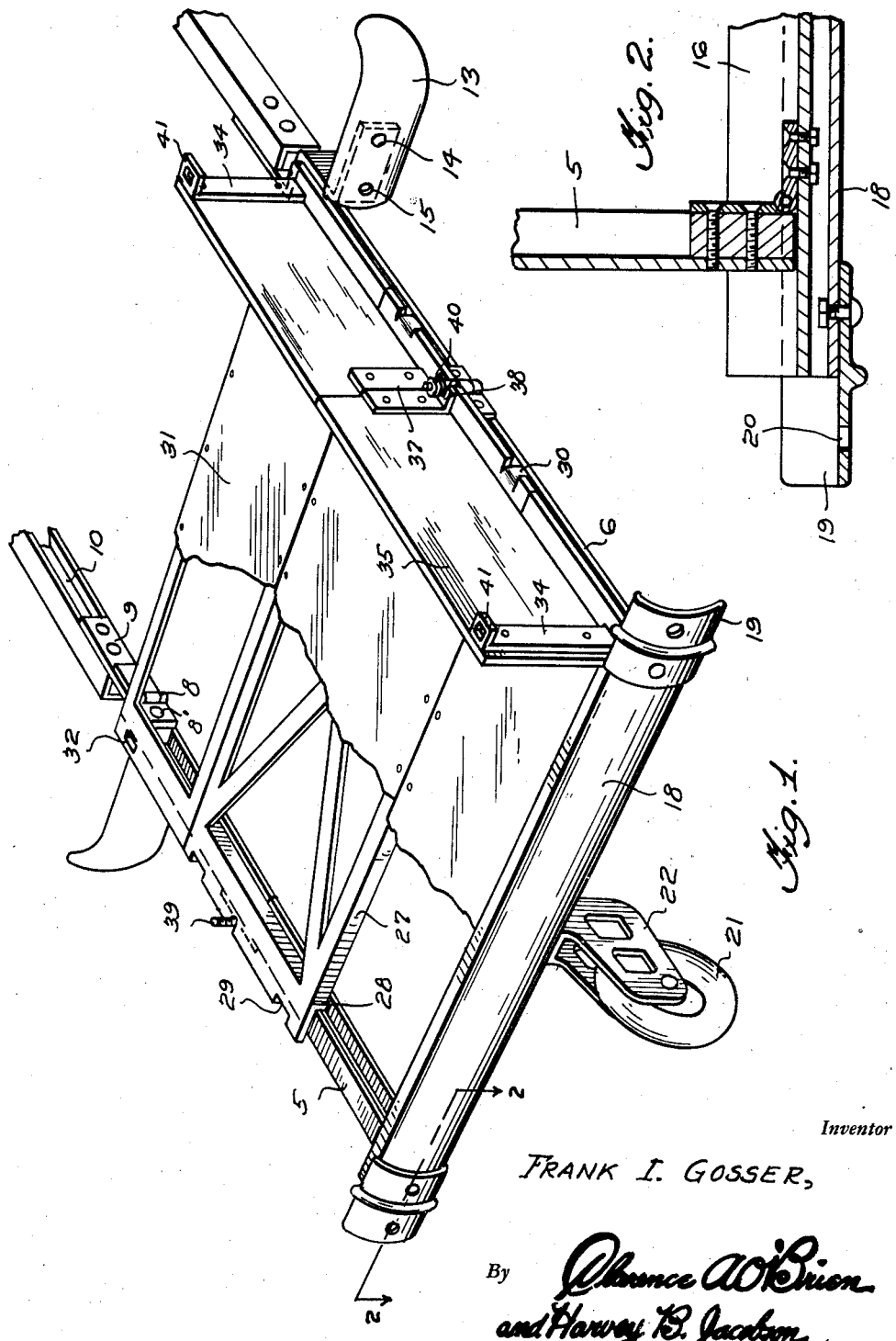

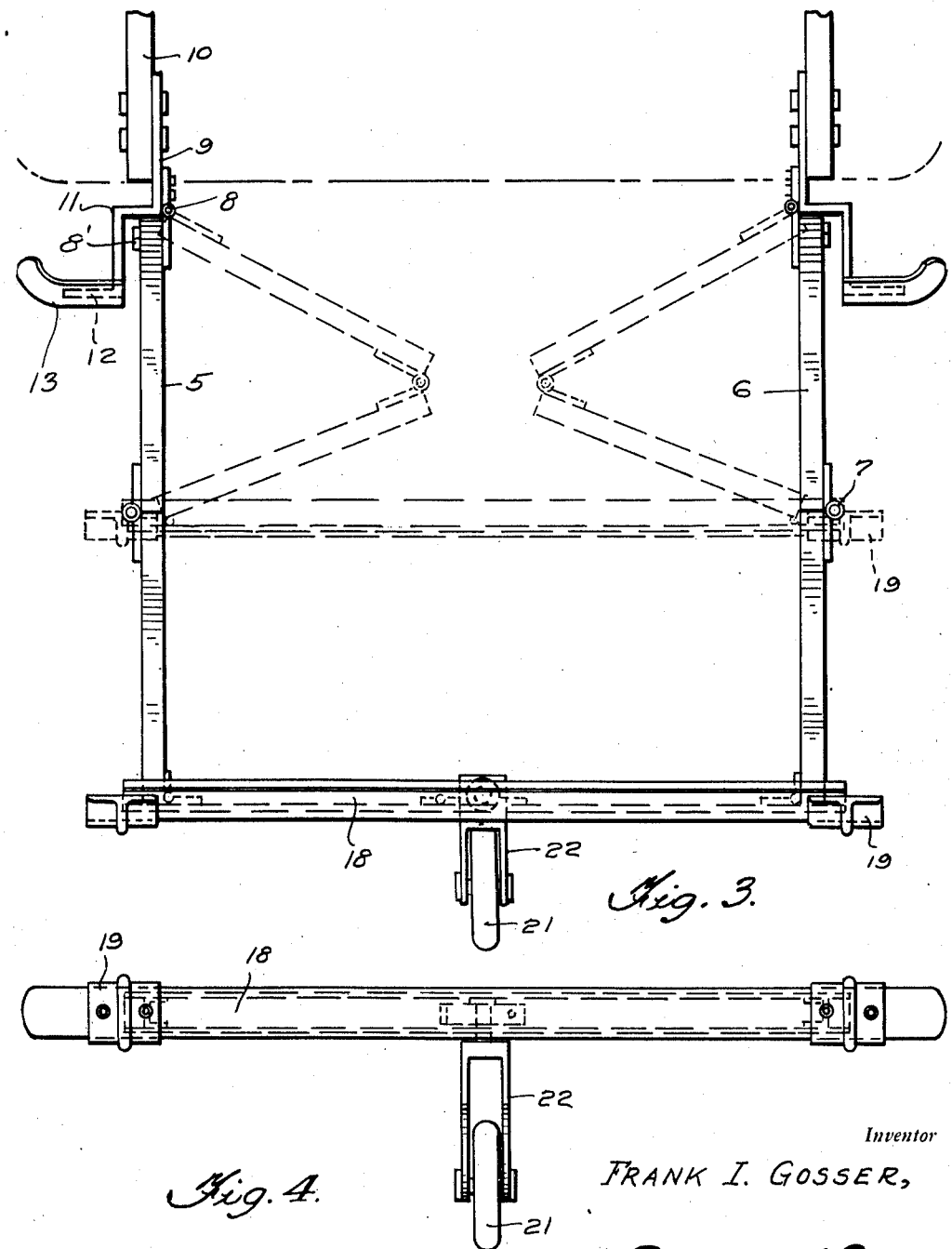

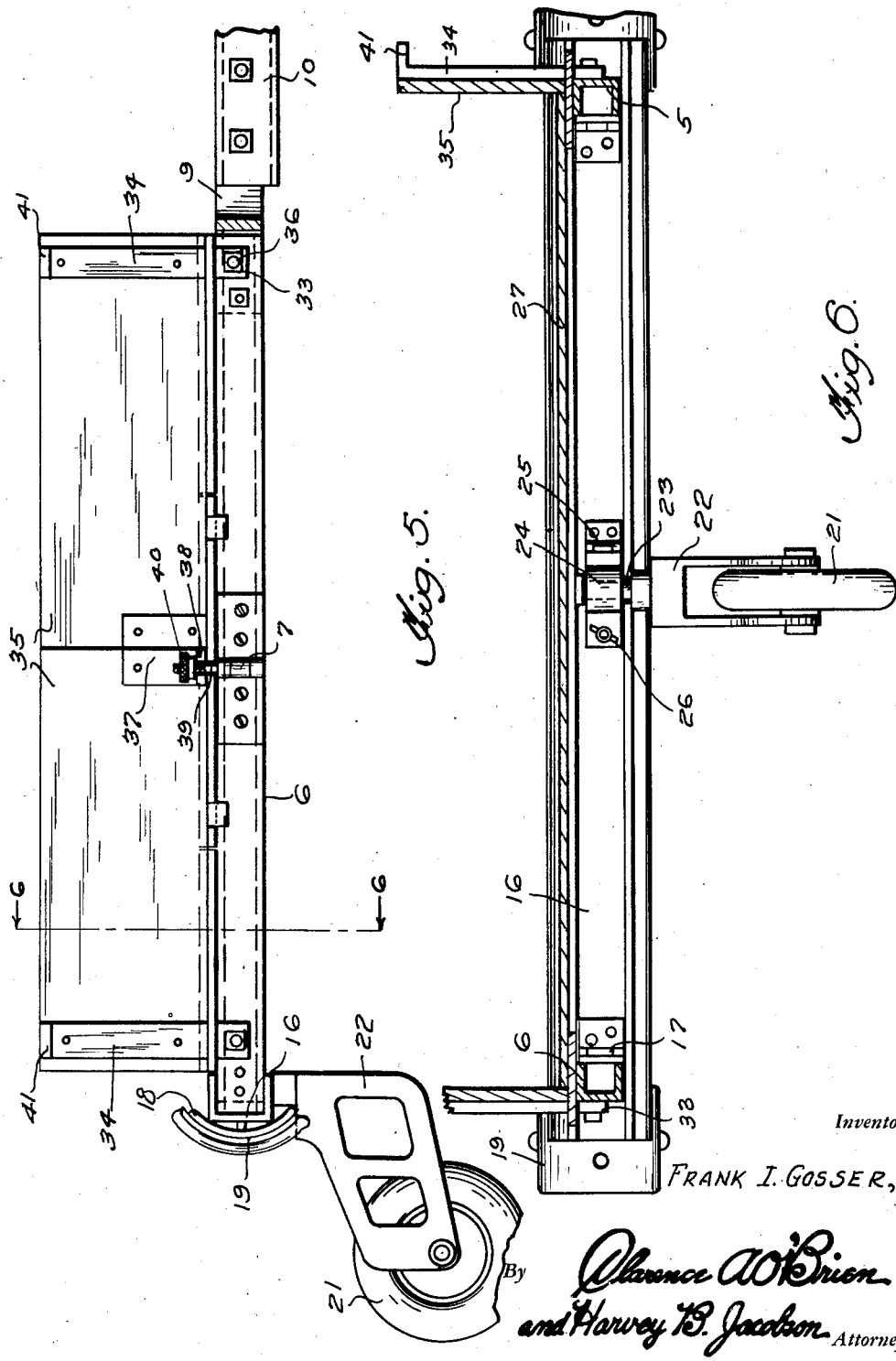

Patented Aug. 31, 1943

2,328,138

UNITED STATES PATENT OFFICE 2,328,138

COLLAPSIBLE TRAILER

Frank I. Gosser, Miami, Fla.

Application April 27, 1942, Serial No. 440,690

4 Claims. (Cl. 280—33.4)

The present invention relates to new and useful improvements in trailers adapted for attaching at the rear of an automobile or similar motor vehicle, and has for its primary object to provide a collapsible frame adapted for movement into and out of position relative to the rear end of the vehicle, and including removable floor and side members to form the trailer body adapted for mounting on the frame when the same is in its open position and also providing a wheel for supporting the rear end of the trailer frame.

A further important object of the present invention is to provide a sectional bumper for the rear end of the vehicle including an intermediate section secured to the rear end of the trailer frame and adapted for movement into a position flush with the end sections of the bumper, which are carried by the vehicle, to provide a continuous bumper construction when the trailer is in collapsed condition.

A further object is to provide a device of this character of simple and practical construction, which is neat and attractive in appearance, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the trailer in open position and with parts broken away.

Figure 2 is a fragmentary sectional view taken substantially on a line 2—2 of Figure 1.

Figure 3 is a top plan view with the body of the trailer removed.

Figure 4 is a rear elevational view.

Figure 5 is a side elevational view, and

Figure 6 is a vertical transverse sectional view taken substantially on a line 6—6 of Figure 5.

Referring now to the drawings in detail, the numerals 5 and 6 designate a pair of sectional longitudinal trailer frame members, of substantial channel form in cross-section and hingedly connected to each other as shown at 7. The inner ends of the members 5 and 6 are connected by hinges 8 to bumper brackets 9 projecting rearwardly from the chassis frame 10 of the vehicle to permit inward folding movement of the members 5 and 6 of their collapsed positions, and the hinges 8 are connected to the respective members 5 and 6 by pins 8' to permit vertical swinging movement of the frame members. The bumper brackets 9 are longitudinally offset at an intermediate portion, as shown at 11, the outer ends of the brackets being bent angularly outwardly, as shown at 12, and have attached to the rear face thereof the end bumper sections 13 by means of a rivet 14, each of the end bumper sections also having an opening 15 therein for a purpose to be hereinafter explained.

The sections of the side members 5 and 6 are arranged to swing inwardly into a position transversely at the rear end of the vehicle, as shown by the dotted lines in Figure 3 of the drawings.

The rear ends of the frame members 5 and 6 are connected by a cross-member 16 by means of hinges 17.

To the rear face of the cross-member 16 is secured an intermediate bumper section 18 and projecting outwardly from each end of the bumper section 18 is a connector 19 having an opening 20 therein adapted to register with the opening 15 of the end section 13 and adapted to receive a bolt when the trailer is in collapsed position to secure the intermediate section and end sections of the bumper in aligned position.

The rear end of the trailer is supported on a wheel 21 by means of a yoke 22 having a spindle 23 rising therefrom and journaled in a bearing 24 hingedly connected at one end as at 25 to the inside of the cross-member 16, the other end of the bearing being releasably secured to the cross-member by means of a wing nut and bolt 26.

A plurality of frame members 27 are supported on the side members 5 and 6 of the trailer, the frame members 27 having a shoulder 28 adjacent each end adapted to abut the inner edge of said frame members 5 and 6, as shown to advantage in Figure 1 of the drawings. The outer ends of the frame members 27 are formed with notches 29 and adapted to receive downwardly extending tongues 30 formed on the ends of flooring planks 31 secured on the frame members 27.

The frame members 27, adjacent the front and rear ends of the trailer frame, are also formed with slots 32 adapted to receive the downwardly projecting ends 33 of end plates 34 secured to the wall members 35 cooperating with the flooring 31 to form the body of the trailer. The downwardly extending ends of the end plates 34 are secured in position to the frame members 5 and 6 by means of bolts and nuts 36.

A pair of the wall members 35 is provided for each side of the trailer and the adjacent ends of the wall members of each pair are hingedly connected by means of a hinge member 37, the lower end of the hinge member having a laterally extending lug 38 thereon of bifurcated construction and adapted to receive the threaded upper end 39 of the hinge pin for the hinge member 7, the lug being secured in position to said hinge pin by means of a nut 40.

In the operation of the device, the side frame members 5 and 6 are normally folded inwardly in a transverse position at the rear end of the vehicle with the bumper sections 18 and 13 connected together by the connectors 19. When the connectors 19 are detached from the end section 13 of the bumper, the trailer frame may be moved outwardly into the full line position shown in Figure 3 of the drawings, and the wheel 21 may then be attached in position thereto.

The frame sections 27 and flooring 31 are then placed in position on the upper edge of the frame 5 and 6 and the flooring secured in position by the end walls 35. The flooring 31 and end walls 35, as well as the flooring frames 27, may be stored in a convenient position in the rear compartment of the vehicle when the same are removed from the trailer frame.

Stake sockets 41 may be formed at the upper ends of the end plates 34 to receive stakes (not shown) for supporting a canvas top above the body of the trailer.

It is believed the details of construction, operation and advantages of the device will be readily understood from the foregoing without further detailed explanation.

Having thus described the invention what I claim is:

1. A vehicle trailer comprising a collapsible frame adapted for securing to the rear of a vehicle for extending rearwardly therefrom into an open position, a removable body including sectional flooring and walls supported on the frame, a wheel supporting the rear end of the frame when in open position, and a sectional bumper including stationary end portions carried by the vehicle and an intermediate portion movable into a position in alignment with the end portions transversely of the vehicle when the frame is in its collapsed position, and connector plates at each end of the intermediate portion adapted for securing in overlapping relation to the end portions.

2. A vehicle trailer comprising an extensible frame composed of sectional side members and an end member, said members being hingedly connected to each other and said side members being collapsible inwardly toward each other into a position parallel with the end member, a sectional flooring frame supported on the side members, a downwardly extending flange on the flooring frame engaging the inner edges of the side members, flooring planks supported on the flooring frame, downturned tongues on the flooring planks engaging the outer edges of the side members and cooperating with the flanges to prevent collapsing movement of the first-named frame, and upstanding wall sections detachably secured to the planks.

3. A vehicle trailer comprising an extensible frame composed of sectional side members and an end member, said members being hingedly connected to each other and said side members being collapsible inwardly toward each other into a position parallel with the end member, a sectional flooring frame supported on the side members, a downwardly extending flange on the flooring frame engaging the inner edges of the side members, flooring planks supported on the flooring frame, downturned tongues on the flooring planks engaging the outer edges of the side members and cooperating with the flanges to prevent collapsing movement of the first named frame, said planks having openings therein, and wall sections supported in an upright position on the planks and having posts inserted in said openings.

4. A vehicle trailer comprising an extensible frame composed of sectional side members and an end member, said members being hingedly connected to each other and said side members being collapsible inwardly toward each other into a position parallel with the end member, a sectional flooring frame supported on the side members, a downwardly extending flange on the flooring frame engaging the inner edges of the side members, flooring planks supported on the flooring frame, downturned tongues on the flooring planks engaging the outer edges of the side members and cooperating with the flanges to prevent collapsing movement of the first named frame, said planks having openings therein, wall sections supported in an upright position on the planks and having posts inserted in said openings, said side members including upstanding hinge pins, and means carried by the wall sections detachably connected to said hinge pins.

FRANK I. GOSSER.